Dec. 14, 1965 R. A. LEVY 3,223,932

FOUR SPIN-FLIP SIX-LEVEL DOPED SILICON MASER AMPLIFIER

Filed Nov. 15, 1962 3 Sheets-Sheet 1

INVENTOR.
ROBERT A. LEVY
BY Morse & Altman
ATTORNEYS

INVENTOR.
ROBERT A. LEVY
BY
Morse & Altman
ATTORNEYS

Dec. 14, 1965 R. A. LEVY 3,223,932

FOUR SPIN-FLIP SIX-LEVEL DOPED SILICON MASER AMPLIFIER

Filed Nov. 15, 1962 3 Sheets-Sheet 3

INVENTOR.
ROBERT A. LEVY

BY *Morse & Altman*

ATTORNEYS

United States Patent Office — 3,223,932 — Patented Dec. 14, 1965

3,223,932

FOUR SPIN-FLIP SIX-LEVEL DOPED SILICON MASER AMPLIFIER

Robert A. Levy, 1617 N. Mesa St., El Paso, Tex.
Filed Nov. 15, 1962, Ser. No. 237,937
7 Claims. (Cl. 330—4)

This invention relates generally to masers and more particularly comprises a new and improved six-level tunable maser employing a compensated semi-conductor as the active element.

The technique of microwave amplification by stimulated emission of radiation depends upon the existence of multiple discrete energy levels in a medium. Normally, the population distribution among the possible energy levels in a medium is governed by Boltzmann's equation and, accordingly, in the system, higher energy levels are less populated than lower energy levels. When there is incident on the medium electro-magnetic wave energy of the frequency corresponding to the energy difference between two particular levels in accordance with Planck's equation $$V=\frac{E_2-E_1}{H}$$

where V is the signal frequency, H is Planck's constant and $E_2—E_1$ is the energy difference between the two levels there will be an exchange between the population of these levels. A fraction of the population in the lower level will absorb the radiation and will be raised to the higher level. An equal fraction of the population in the higher level will be stimulated to emit radiation and will drop to the lower level. When, as normally is the case, there is a greater population in the lower level, the result will be a net absorption of energy.

Conversely, if there be provided a medium in which an upper energy level is more densely populated than a lower level, there can be net emission; an incident radio signal of a frequency corresponding to the difference in energy of these levels will cause more power of such frequency to be radiated than is absorbed whereby amplification of the radio signal results. This state of inverted population of energy levels is characterized as a negative temperature state.

Heretofore, maser devices have required a pumping source of a frequency much higher than that of the signal frequency. In addition, existing masers are not tunable over a particularly wide frequency band.

Accordingly, it is a general object of the present invention to provide improvements in maser devices.

A more particular object of this invention is to provide a doped silicon maser device that is tunable over a wide microwave frequency band.

Another object of this invention is to provide a six-level maser system in compensated silicon in which the pump power requirement is in the same frequency band as the signal.

More particularly, this invention features a six-level tunable maser device employing a compensated semiconductor as the active element. Maser action is achieved by means of negative temperature produced by multiple relaxation mechanisms described herein.

However these and other objects of the invention, along with further objects and advantages thereof, will become more readily apparent from the following detailed description of preferred embodiments of the invention, with reference being made to the accompanying drawings, in which.

Figure 1:
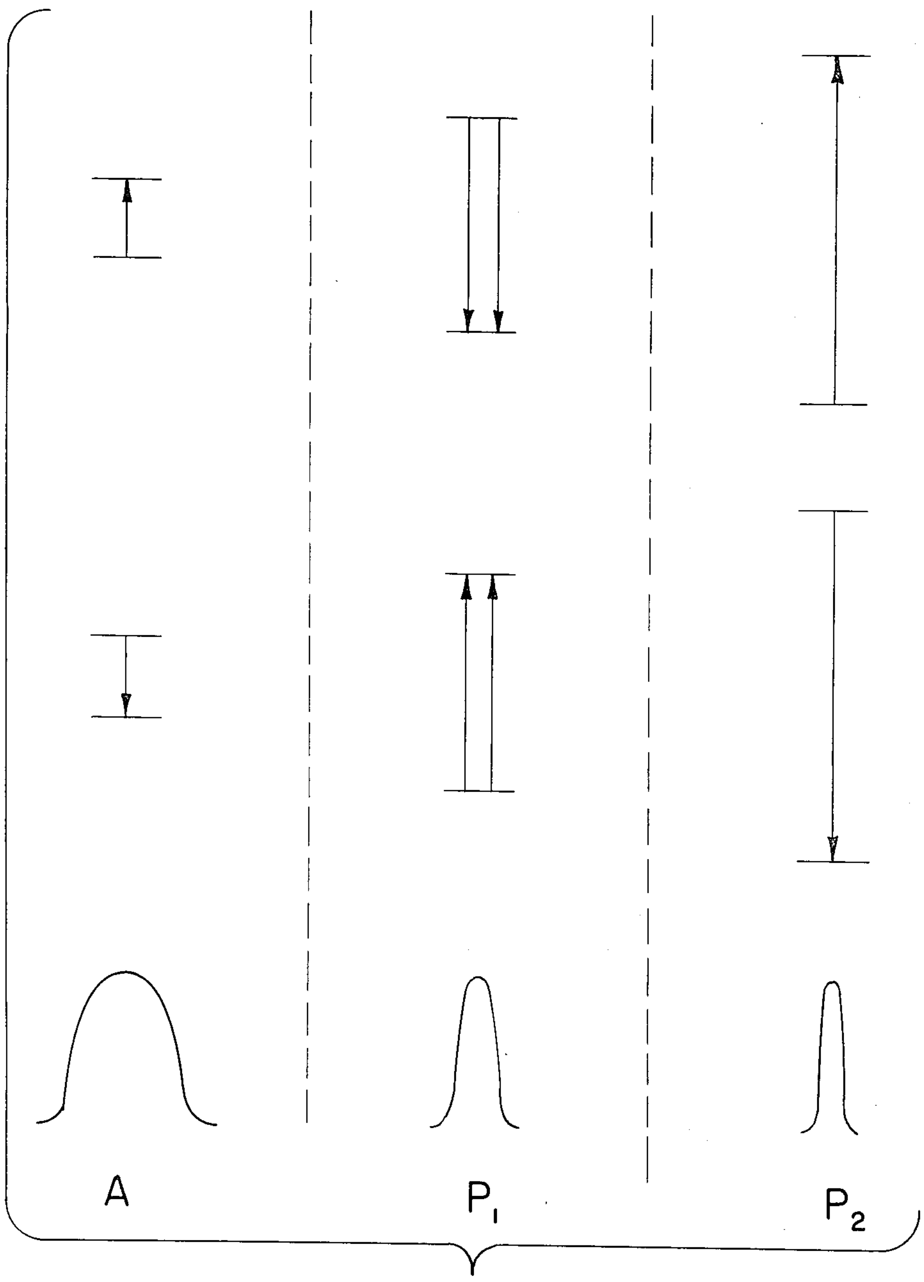
FIG. 1 is a diagram of electron spin resonance in a medium displaying the four spin-flip mechanisms through which cross-relaxation occurs.
Figure 2:
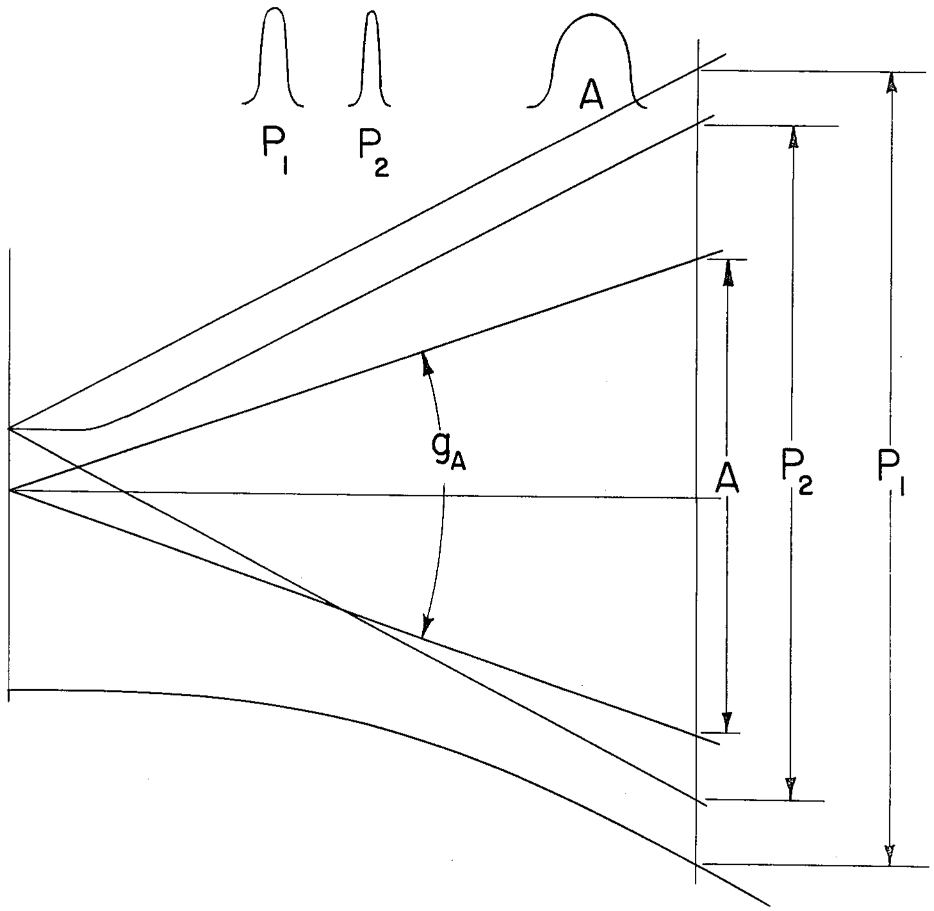
FIG. 2 is a Breit-Rabi diagram showing both donor and acceptor levels.

The development of quantum electronic devices such as masers has been made possible by a large body of knowledge in the field of magnetic resonance. Simply stated, magnetic resonance consists of driving a system of atomic oscillators with an external source set at the natural frequency of the oscillators. The present invention concerns itself with the spin of the valence electron as the oscillating element in the atom.

The atomic oscillators must possess some degree of isolation from each other in order for the para-magnetic resonance to be observable. The achievement of paramagnetic resonance in bulk systems such as solids and liquids requires that the atoms undergoing resonant transitions have environments similar to that of atoms in a molecular beam or a gas. If inter-atomic distances are sufficiently small that appreciable overlap occurs among the elctronic wave functions, the electron spins will occupy paired states and not contribute to the paramagnetic resonance phenomena. Several types of isolation will result in paramagnetism and hence resonance absorption. These include: dilute impurity concentrations, unpaired inner atomic shells and free radicals.

Most of the information on the electronic structure of solids has been obtained from the investigations of dilute impurities. As a matter of fact, it has been found that many of the properties of solids are due to the impurities contained in their structure. It is also this dilute impurity concentration which has provided the systems for maser operations. If the interaction with the driving source is such that energy is absorbed by the atomic system, the phenomenon is known as resonant absorption. If energy is emitted by the atomic system as a result of the stimulation of the driving source, the phenonmenon is maser action.

The primary problem in maser design is that of obtaining a higher population in the excited state relative to the ground state so that net emission will occur. State populations are normally determined by a Boltzmann factor which, in equilibrium always gives higher population in the lower state. At high temperatures, the state populations become more nearly equal and the phenomenon of RF saturation is equivalent to raising the electron spin system to an infinitely high temperature.

A population with higher concentrations in the higher state would correspond in the formalism to a negative temperature. Since this distribution is not an equilibrium situation, it is not defined in the thermodynamic sense. However, the concept of negative temperature is useful when dealing with non-equilibrium distributions, in particular where a finite number of levels are involved. Maser action takes place when a set of levels is at a negative temperature, the lower the better.

To achieve this negative temperature, it is necessary to employ some sort of a trick since the most that can be achieved by RF saturation (essentially a thermal process) is an equalizing of populations.

The prior art of maser technology has evolved through several basic types.

(1) The original maser of Townes and his co-workers (Physical Review 99, 1264 (1955)) utilizes physical separation of the molecules in the two states by molecular beam techniques. A molecular beam of ammonia was produced by allowing ammonia molecules to diffuse through a collimator. The beam then traversed a region in which a highly non-uniform electrostatic field formed a selective lens, focusing those molecules which were in upper states while defocusing those in lower states. The emerging upper state molecules entered in a resonant cavity in which downward transitions to the lower states were induced. Power input to the cavity at this frequency would be amplified. If the beam density is increased beyond a critical value, oscillation occurs.

(2) The solid state maser suggested originally by Bloembergen (U.S. Patent 2,909,654) involved a different mechanism to produce higher upper state populations. This method consists of power saturation of the outer two of a three energy level system to obtain an inversion of the population of the inner pair of levels. This technique requires a pumping frequency considerably higher than the signal frequency.

By utilizing multiple transitions it has been found possible to reduce the pump frequency to the same range as the signal frequency.

Two basic relaxation processes for spin systems exist; relaxation to the lattice and internal relaxation among the spins. The spins may interact with applied magnetic fields, the so-called Zeeman energy; with electric fields, usually atomic in origin; and with one another through magnetic dipolar exchange coupling the so-called spin-spin energy. Relaxation which changes the total energy of these interactions is called spin-lattice relaxation; that which does not is called spin-spin relaxation. (As used here, the term lattice does not refer to an ordered crystal but rather signifies degrees of freedom other than spin orientation, for example, the translation motion of molecules in a liquid.) The former is associated with the approach of the spin system to thermal equilibrium with the host material, the latter with an internal equilibrium of the spins within themselves. The spin-lattice relaxation gives rise to the so-called spin-lattice relaxation time, the time taken for the disturbed population to fall to $1/e$ of its steady state value. The process is obviously non-energy conserving in the spin system since the energy is dissipated thermally to the lattice. The magnitude of the spin-lattice relaxation time can vary over several orders of magnitude from $10^{-6}$ seconds to $10^4$ seconds in some materials with the proper external environments.

Spin-spin relaxation is the establishment of equilibrium throughout a spin system in an energy conserving process in the sense that all the energy remains in the spin system. The relaxation comes about by mutual spin-flip processes usually appearing through the dipolar interaction. The relaxation time is usually much shorter than the spin-lattice time although in some cases they are approximately equal; that is, the spins come to equilibrium with the lattice as fast as they come to internal equilibrium. The spin-spin time determines the observed width of the resonance line.

Cross relaxation consists of relaxation among electrons in different absorption lines. Since the transition energies are different for different lines, normally these interactions would be forbidden because of lack of energy and momentum conservation. Certain situations can occur, however, for cross relaxation to take place. The simplest of these is the overlapping of two resonance lines. In this case, some of the spins in the two lines will have the same energy and the two systems will obtain equilibrium via this "pipe" between the two. In the event that the two systems have different spin-lattice relaxation times, the overlap will enable the one with the longer relaxation time to dump its energy to the one having the shorter relaxation time. In this manner, the Boltzmann distribution will be established more quickly. This double spin-flip is the simplest possible example of cross-relaxation. Multiple spin reversals are also possible. Bloembergen has analyzed a process of energy transfer between adjacent resonances in both nuclear and electronic spin systems. Multiple spin reversals of neighboring spins which are induced by the dipolar and exchange interactions between the ions are primarily responsible for the transfer of energy between resonances. For a given multiple spin-flip process to be important in the establishment of a spin-spin equilibrium, a necessary requirement is that the total Zeeman energy may be approximately conserved.

The occurrence of higher order spin-flip processes has been verified by Sorokin, Lasher and Gelles. (Physical Review volume 118, page 939 (1960).) The process is a four-spin-flip mechanism consisting of double flip-flops (see FIG. 1). In the forward process, two spins of the center line made a downward transition, while a spin belonging to each satellite made an upward transition. Equilibrium among the three absorption lines is reached when the number of forward transitions per unit time exactly balances the number of reverse transitions per unit time. The time required to attain this equilibrium is the cross-relaxation time $T_{12}$. It is usually intermediate between the spin-lattice relaxation time $T_1$ and the spin-spin relaxation time $T_2$.

It has been proposed that maser action without higher frequency pumping can be achieved by means of a four-spin-flip process in a six-level spin system comprising three equally spaced resonance lines. Spin-lattice relaxation times are assumed long enough that such a high order process would be the primary interaction among the spin systems. By means of this process, saturation of the central resonance line will cause the two satellite lines to saturate. Inversion of one of these satellites is possible if the satellites have an asymmetry in their relaxation population product, as shown by the equation $$\Delta N_{P1}=N_{P1}\left(\frac{e^{\frac{hv}{kt}}-1}{e^{\frac{hv}{kt}}+1}\right)\left(\frac{W_{P1}N_{P1}-W_A N_A}{W_{P1}N_{P1}+W_A N_A}\right)$$

where $N_{P1}$ is the excess population in the lower level of line $P_1$ (the line to be inverted) and $N_{P1}$ is the total population of species $P_1$. $P_1$, $P_2$ and A refer to the three equally spaced resonance lines, and the W's are relaxation rates.

Physically, this process may be described as follows. If all three lines are saturable and the central line $P_2$ is RF saturated, the only place its energy can go is equally to the two satellites via the four spin-flip process and the steady state situation would result in the forward process $$\begin{matrix} P_1 & P_2 & A \\ \uparrow & \downarrow\downarrow & \uparrow \end{matrix}$$

and reverse process $$\begin{matrix} P_1 & P_2 & A \\ \downarrow & \uparrow\uparrow & \downarrow \end{matrix}$$

occurring with equal probability (see FIG. 1). If one of these satellites, for example satellite A, is unsaturable the forward process for this line would be more likely (absorption) and since whenever A absorbs $P_1$ continues to absorb due to the four spin-flip mechanism, satellite $P_1$ continues to absorb even after saturation and this is inverted to the extent that A fails to saturate.

The problem is to provide three equally spaced resonances with asymetrical saturation characteristics and, in order to achieve operation at any desired frequency, it is necessary to have three lines of constant or controllable separation.

This invention features the use of the system of silicon doped with phosphorous (lines $P_1$ and $P_2$) and a Group III acceptor (line A) that is, compensated silicon. The six level system consists of the two phosphorous absorption lines and the single acceptor line. The long relaxation time of the phosphorous states makes these lines ideal as the pump and signal resonances. The short relaxation time of acceptor absorption is desirable for the idler frequency.

This system results in a device which is tunable over a wide portion of the microwave region. The basis of this is as follows: G-values of acceptor spin resonances in silicon have been shown to be a function of the angle between the strain axis in the crystal and the D.C. magnetic field. Thus, by adjustment of this angle, the separation between line A and the phosphorous component $P_2$ can be made equal through the separation of $P_1$ and $P_2$ at any field. In addition, the width of the acceptor resonance is controllable by the magnitude of this applied stress which may be useful in design considerations. It is also known that compensation of donor and acceptor spin states can be removed by shining light on the sample at liquid helium temperature.

The choice of acceptor will depend to some extent on cavity design and the best compromise choice of directions for stress, D.C. field, and RF field. Boron has probably been most extensively investigated; gallium has a G-value near 2 at a 90° stress-field angle. Experiments on electron spin resonance adsorption of Pt and Pd in silicon show that these atoms enter the host lattice as acceptors and have resonances with field dependent G-values. These lines are resolved even without the application of external stress to the sample. If a favorable relaxation time is indicated, one of these impurities might be the suitable choice of the acceptor since the stress requirement would be eliminated.

Figure 3:
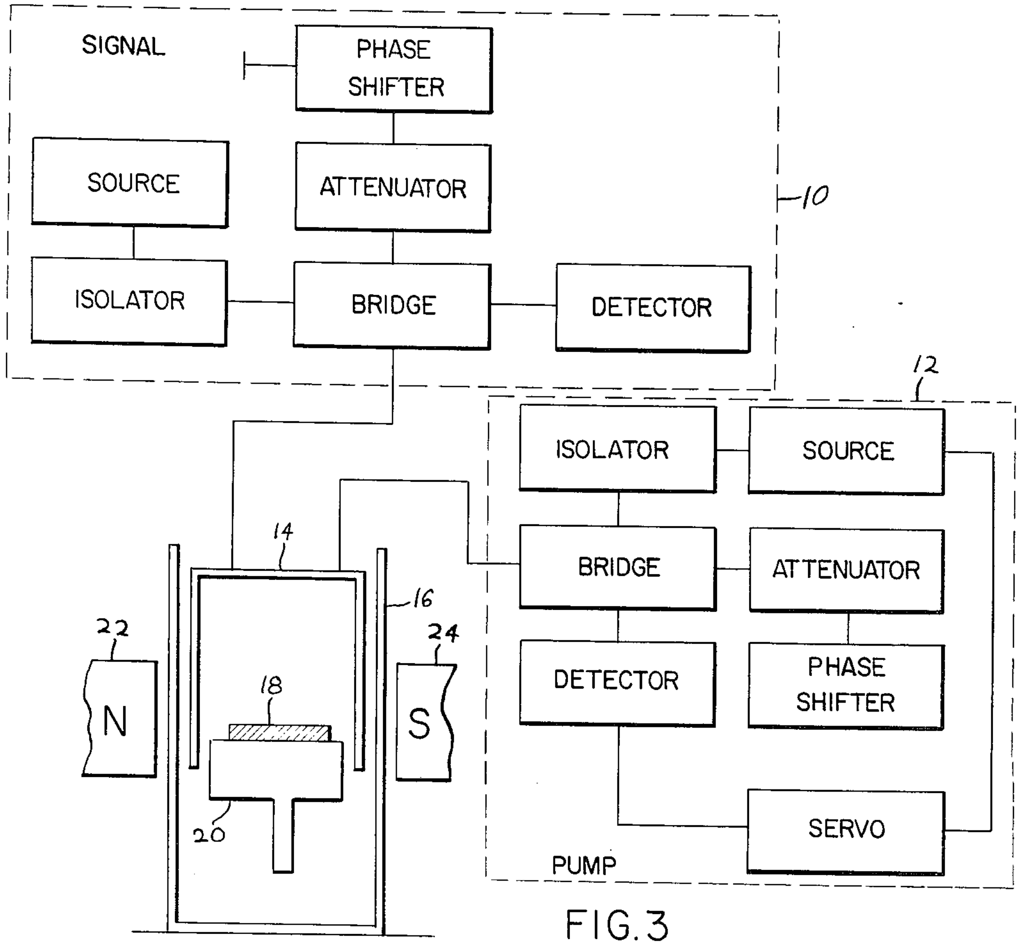
FIG. 3 is a schematic diagram showing an illustrative maser in accordance with the invention, and, FIG. 4 is a sectional view in side elevation, somewhat schematic of a pair of single mode cavities embodying the invention, as a modification thereof.
Figure 4:
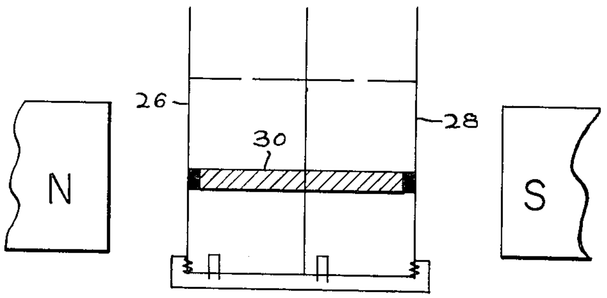

Typical apparatus for operating the maser is illustrated in FIGS. 3 and 4 and includes a signal section 10 and a pump section 12 connected to a dual mode cylindrical cavity 14 disposed within a cryostat 16. Typically, the cryostat is charged with a quantity of liquid helium adapted to maintain a compensated semi-conductor solid state medium 18 at a low temperature level. The medium 18 is mounted on a sliding piston 20 to permit tuning of the apparatus. Pole pieces 22 and 24 are located on opposite sides of the cryostat as shown in the drawings. The requirement for stressing the medium 18 may be accomplished by prior stressing at an elevated temperature and cooling the medium to freeze in the strain.

As an alternate measure, the cavity of FIG. 4 is seen to comprise a pair of single-mode cavities 26 and 28 with an active medium 30 extending across both components. In practice a ganged tuning plunger may be provided for simultaneous tuning of both cavities. As another possible configuration, a travelling wave arrangement may be employed to permit electronic tuning with a consequent increase in instantaneous bandwidth. Referring again to FIG. 3, the signal section will be seen to comprise a low power *x*-band stabilized klystron feeding one mode of the cavity 14. The cavity is a reflection element and forms one arm of a magic T microwave bridge circuit. The other arm consists of a precision phase shifter and attenuator which can be used to balance the bridge to produce a known output or introduce a desired amount of phase or amplitude unbalance.

The purpose of having some unbalance in the bridge is to bias the detecting medium to its point of maximum sensitivity and to allow the medium to be sensitive to the real (dispersion) or imaginary (absorption) component of the magnetic susceptibility. If the bridge is unbalanced in amplitude, the medium will be sensitive to adsorption, in phase, to dispersion.

The signal consisting of amplitude modulated microwave power is detected by a crystal diode and amplified by a preamplifier, subsequently further amplified by a tuned amplifier for presentation on an oscilloscope or sent to a phase sensitive detector for D.C. recording.

The pump section 12 consists of a high power *x*-band stabilized klystron feeding the other mode of the *x*-band bi-modal cavity. An electronic switch serves to modulate the pump and to trigger the *x*-axis of the oscilloscope.

While the invention has been described with particular reference to the illustrated embodiments, it will be understood that numerous modifications thereof will appear to those skilled in the art. It will also be understood that the above description and accompanying drawings should be taken as illustrative of the invention and not in a limiting sense.

Having thus described my invention, what I claim and desire to obtain by Letters Patent of the United States is:

1. A device for amplifying high frequency electromagnetic energy, comprising a solid state medium characterized by a six-level energy system, said medium being composed of silicon doped with phosphorous and an acceptor impurity selected from the group composed of aluminum, boron, indium and gallium, means for producing an inversion of the spin populations of said levels, means for supplying to and abstracting from said medium energy of a frequency corresponding to the separation between a pair of energy levels and control means for selectively adjusting the separation of the energy levels of the acceptor impurity from those of the phosphorous.

2. A device for amplifying high frequency electromagnetic energy, comprising a solid state medium characterized by a six-level energy system, said medium being composed of silicon doped with phosphorous and an acceptor impurity selected from the group composed of platinum and palladium, means for producing an inversion of the spin populations of said levels, means for supplying to and abstracting from said medium energy of a frequency corresponding to the separation between a pair of energy levels and control means for selectively adjusting the separation of the energy levels of the acceptor impurity from those of the phosphorous.

3. A device according to claim 1 including tunable cylindrical cavity means for receiving said medium and conducting means for connecting said supply and abstracting means in operative association with said cavity means.

4. A device according to claim 3 wherein said cavity means comprises a pair of single-mode cavities and said medium extends into both of said cavities.

5. Apparatus for the production of microwave energy by maser action, comprising (a) a solid state medium characterized by a six-level energy system, (b) said medium being composed of silicon doped with phosphorous and an acceptor impurity selected from the group composed of aluminum, boron, indium and gallium, (c) said medium having an electron spin system characterized by a center line and two satellite resonance lines one being a signal frequency and the other an idler frequency, (d) said center line and one of said signal lines being saturable and said idler line being unsaturable, (e) means for supplying saturating pumping microwave energy to said medium at the center line frequency whereby energy will be transferred to both of said satellite lines via a four spin-flip process and said signal line will be inverted to the extent that said idler line fails to saturate, (f) means for supplying to and abstracting from said medium signal energy of a frequency corresponding to the separation between a pair of energy levels, and, (g) control means for adjusting the spacing and linewidth of said idler line.

6. Apparatus according to claim 5 wherein said control means includes means for applying a D.C. magnetic field to said medium and means for uniaxially stressing said medium to vary the angle between the strain axis and said field.

7. Apparatus according to claim 6 wherein said supplying means includes a cavity to acocmmodate said medium, means for varying the dimension of said cavity and cryostat means for lowering the temperature of said medium.

References Cited by the Examiner

"Progress in Low Temperature Physics," edited by Gorter, article by Bloembergen, pp. 396–429 relied on (North Holland Publishing Co., Amsterdam, 1961).

ROY LAKE, *Primary Examiner.*